UNITED STATES PATENT OFFICE.

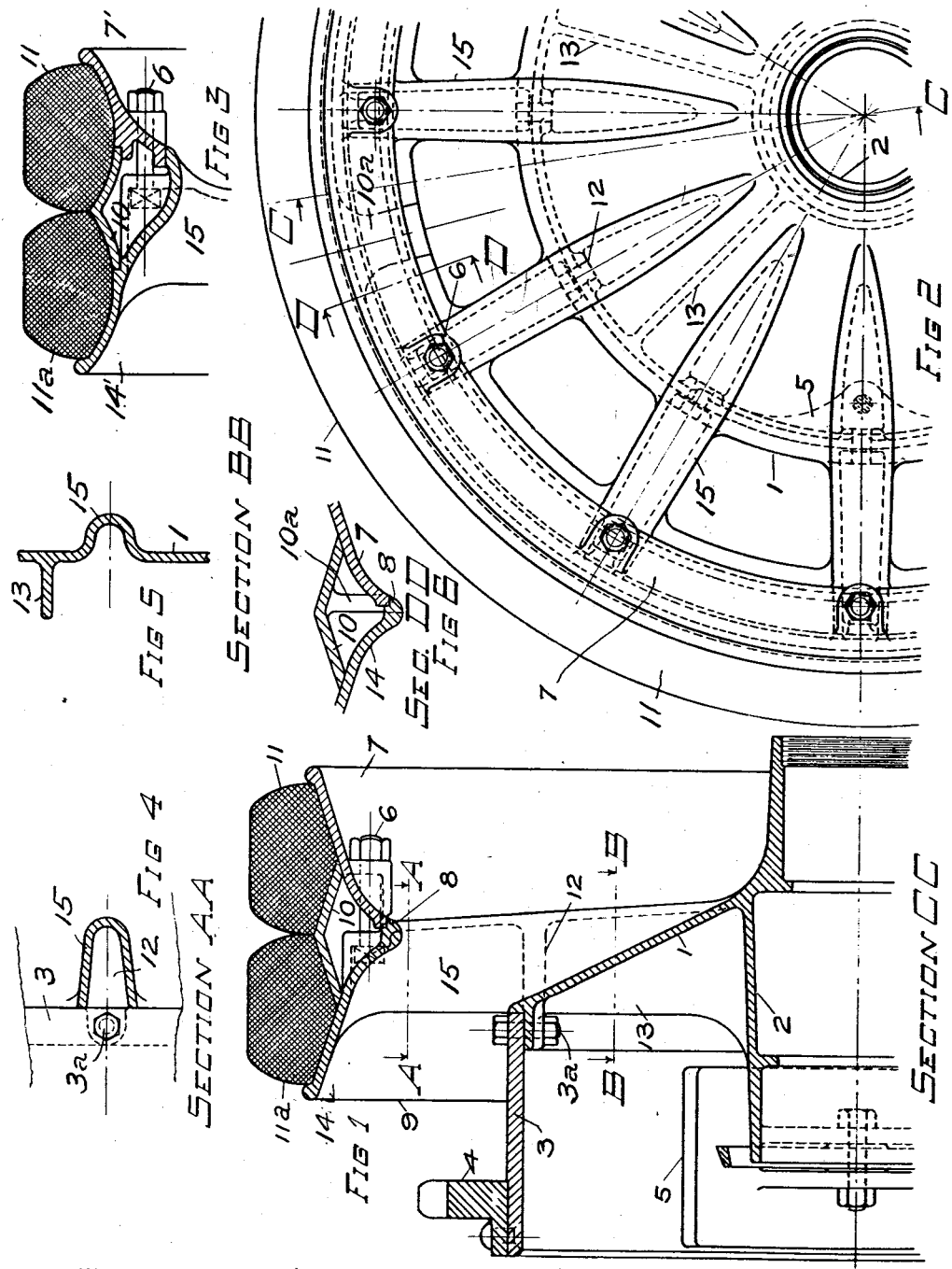

CHARLES L. HEISLER, OF SCHENECTADY, NEW YORK.

WHEEL FOR VEHICLES.

1,113,213. Specification of Letters Patent. Patented Oct. 13, 1914.

Application filed February 5, 1912. Serial No. 675,479.

*To all whom it may concern:*

Be it known that I, CHARLES L. HEISLER, of Schenectady, in the county of Schenectady and State of New York, have invented a certain new and useful Improvement in Wheels for Vehicles, of which improvement the following is a specification.

My invention relates to wheels for road vehicles, and more particularly to those used in automobile trucks, and its object is to provide a wheel of such class which shall be of simple, strong, and inexpensive construction, and which will admit of the convenient and expeditious attachment and detachment of the tire, as may, from time to time, become necessary or desirable.

The improvement claimed is hereinafter fully set forth.

In the accompanying drawings: Figure 1 is a half transverse section through a vehicle wheel embodying my invention, on the line C C of Fig. 2; Fig. 2, a partial front view, in elevation, of the same; Fig. 3, a section through the rim and tires, in the same plane as Fig. 1, illustrating a modification of structural detail; Figs. 4 and 5, transverse sections, through a spoke, on the lines A A and B B respectively, of Fig. 1; Fig. 6, a partial section through the rim, on the line D D of Fig. 2.

In the practice of my invention, I provide a hub, 2, of metal, which is formed integral with the rear section, 14, of a sectional rim, to which it is connected by a plurality of spokes, 15, of U form in transverse section. The rim comprises the rear section, 14, aforesaid; a front section, 7, secured thereto by clamping bolts, 6, parallel with the axial line of the wheel; and an outer middle section, 10, having a double inclined or curved face, and fitting around the front and rear sections, on opposite sides of a central transverse plane intermediate between their outer ends. The front section, 7, may be fitted against a shoulder, 8, on the rear section, 14, as shown in Figs. 1 and 6, or may surround a cylindrical face thereon, as in Fig. 3.

In order to prevent relative circumferential movement of the rim sections, 14, 7, and 10, and relieve strain on the clamping bolts, 6, a tongue, 10ª, is formed on the inner surface of the section, 10, said tongue engaging notches or recesses in the adjacent sides of the sections, 14, and 7.

As shown in Fig. 1, the faces of the middle section, 10, are inwardly inclined from the middle of the section, and the adjoining faces of the front and rear sections are correspondingly outwardly inclined, thereby providing two circumferential grooves, of angular section, in each of which there is fitted one of a pair of tires, 11, 11ª, having correspondingly formed inner surfaces. The faces of the rim sections 7' and 14' shown in Fig. 3, are inwardly and outwardly curved, instead of inclined, and the inner surfaces of the tires, 11, 11ª, are correspondingly formed. The function of providing a circumferential groove for the reception of a tire, being similarly performed by the provision of either inclined or curved peripheral surfaces on the rim sections, said two specific forms of peripheral surfaces are, for the purposes of my invention, mechanical equivalents. The spokes, 15, are, in Fig. 3, shown as extended outwardly toward the front of the wheel, thereby giving them a wider bearing on the rim, and preventing the outer section of the rim from being subjected to excessive stresses when the wheel strikes a curb and the load is thrown on its outer edge.

A rearwardly extending conical flange, 1, is formed on the hub, 2, said flange being integral with, and interposed between, the spokes, 15, and having a plurality of radial ribs, 13, on its inner side. The conical flange is provided for the support of a gear and brake drum, 3, which may be either secured to it by bolts, 3ª, as shown, or be formed integral with it. A driving gear, 4, is secured on the periphery of the drum, 3, at its rear end, and a brake shoe, 5, is suspended adjacent the hub, in the usual manner, in proper position to be brought into frictional contact with the inner surface of the drum, by any suitable known brake applying mechanism.

In order to provide a continuous bearing on the conical flange, 1, for the drum, 3, a rib or bridge, 12, is cast in the space between the side ribs of each of the spokes, 15, said ribs projecting into the spaces in the flange, 1, opposite the spokes, 15, and serving to receive the connecting bolts, 3ª, of the drum, when the latter is made separate from the flange.

Certain features of the general wheel structure herein described are not claimed as of my present invention, as the same form the subject of a divisional application, filed by me, May 27th, 1912, Ser. No. 699,849.

I claim as my invention, and desire to secure by Letters Patent:—

1. In a vehicle wheel, the combination of a hub, a rear rim section having a face which is outwardly tapered from front to rear, a plurality of spokes connecting said hub and rear rim section, a front rim section outwardly tapered from rear to front and fitting detachably on the rear rim section, a middle rim section fitting around the rear and front rim sections and having a double inwardly inclined peripheral face, and clamping bolts connecting the rear and front rim sections.

2. In a vehicle wheel, the combination of a hub, a rear rim section having an inclined peripheral face, a plurality of spokes connecting said hub and rear rim section, a detachable front rim section fitting on the rear rim section and having a peripheral face inclined reversely to that of said rear rim section, an outer middle rim section fitting over said front and rear rim sections and having a double inclined peripheral face, which forms, with the adjoining faces of said sections, two circumferential grooves for the reception of tires, and clamping bolts connecting the front and rear rim sections.

3. In a vehicle wheel, the combination of a hub, a rear rim section having an inclined peripheral face, a plurality of spokes connecting said hub and rear rim section, a detachable front rim section fitting on the rear rim section and having a peripheral face inclined reversely to that of said rear rim section, an outer middle rim section fitting over said front and rear rim sections and having a double inclined peripheral face, which forms, with the adjoining faces of said sections, two circumferential grooves for the reception of tires, a tongue formed on the middle rim section and engaging notches in the front rim sections, and clamping bolts connecting said front and rear rim sections.

CHARLES L. HEISLER.

Witnesses:
    CHAS. H. PARSONS,
    L. ENGLISH.